United States Patent [19]

Ceintrey et al.

[11] 4,054,684

[45] Oct. 18, 1977

[54] COMPOSITION FOR FORMING COLORED IMAGES, NEW RECORDING MATERIAL AND PROCESS USING SAME

[75] Inventors: Claude Ceintrey; Herve Nicolle, both of Dieppe, France

[73] Assignee: La Cellophane, Paris, France

[21] Appl. No.: 637,087

[22] Filed: Dec. 2, 1975

[30] Foreign Application Priority Data

Dec. 3, 1974 France ................................ 74.39454

[51] Int. Cl.[2] ........................ C09D 11/00; B05D 3/06; B05D 3/12

[52] U.S. Cl. ........................................ 427/54; 106/21; 427/56; 427/145; 427/256; 427/287; 427/288; 428/341; 428/342; 428/446; 428/450; 428/452; 428/469; 428/472; 428/537; 428/539; 428/913

[58] Field of Search .................... 427/54, 56, 145, 256, 427/287, 288; 106/21; 428/913, 537, 472, 469, 452, 450, 342, 341, 446, 539

[56] References Cited

U.S. PATENT DOCUMENTS

| | | | |
|---|---|---|---|
| 3,674,535 | 7/1972 | Plose et al. | 428/913 X |
| 3,843,384 | 10/1974 | Adachi et al. | 106/21 X |
| 3,895,173 | 7/1975 | Adachi | 428/913 X |
| 3,950,600 | 4/1976 | Knirsch et al. | 427/145 X |
| 3,952,129 | 4/1976 | Matsukawa et al. | 427/145 X |

*Primary Examiner*—James R. Hoffman

*Attorney, Agent, or Firm*—Sherman & Shalloway

[57] ABSTRACT

The photochromic activity of triphenylmethane paraamino leuco salts is reversibly inactivated in compositions containing the leuco salt with certain metallic oxides or sulfides. The photochromic properties of the leuco salts are restored by the application of energy, e.g. heat, mechanical pressure, etc. The sensitive compositions containing the leuco salt and metal oxide or sulfide are useful in a process for recording information according to a predetermined pattern by applying a local heat source or local pressure source to a recording material containing a layer of the sensitive composition, the application of energy resulting in the formation of colored marks corresponding to the information to be recorded.

23 Claims, No Drawings

COMPOSITION FOR FORMING COLORED IMAGES, NEW RECORDING MATERIAL AND PROCESS USING SAME

BACKGROUND OF THE INVENTION

This invention relates to photosensitive chromogenic compositions, recording materials using such compositions and to a process using such recording materials. More particularly, the present invention relates to chromogenic compositions utilizing a triphenylmethane paraamino leuco salt and a metallic oxide or metallic sulfide; recording materials wherein a layer of the chromogenic composition is deposited on a suitable substrate, and to a process for recording information by the application of energy according to a predetermined pattern corresponding to the information to be recorded. The recording material of the present application has utility in many diverse applications but particularly with regard to scientific recording apparatus, telecopying apparatus, electric printers placed at computer outputs, and the like.

DISCUSSION OF THE PRIOR ART

The advantages of the development of colored images by purely physical means which do not require complicated chemical reactions or use of consumable chemical reactants has led to the development of many types of recording materials wherein development of a color image is provided by the application of heat and/or irradiation with one or more wave lengths of the electromagnetic spectrum. These recording materials employ sensitive compositions which utilize the chromogenic properties of chemical systems.

Baum, U.S. Pat. No. 3,451,338, discloses a thermographic recording system wherein the heat-sensitive composition includes a chromogenic benzoindolinospiropyran material and a di-phenol material capable of producing immediate and lasting color when the two co-reactant materials are brought into liquid contact. Generally, the liquid environment is the result of the application of heat which results in the melting of one or both of the co-reactant materials or a polymeric film binder. However, this system has the drawback that rapid ageing of the background results from the untransformed phenol reactant. It is also known to encapsulate the co-reactant materials but such technique presents difficult procedures in the formation of the encapsulated product and are fragile and limited in storage life.

The thermochromic properties of triphenylmethane derivatives are well known and have been utilized in various sensitive compositions and recording materials. For instance, Baum, U.S. Pat. No. 3,539,375, describes a modification of his earlier thermographic recording system wherein the chromogenic material is crystal violet lactone wherein the lactone and phenolic reactant are dispersed in a matrix of polyvinyl alcohol. While this thermo-responsive record sheet provides some improvement over earlier products it still is not satisfactory with regard to stability resulting from premature reaction between the triphenylmethane derivative and the phenolic co-reactant.

A photosensitive composition containing organic nitrogen-containing color-generator, such as a leuco dye which forms color when it is irradiated with light of a particular wavelength is described by MacLachlan in U.S. Pat. No. 3,390,996. This composition includes, in addition to the leuco dye, a photo-oxidant, which upon irradiation with light of wavelength $W_1$ oxidizes the color-generator to its colored form, and a redox couple of a reductant and an oxidant. When the oxidant is activated by light of a different wavelength $W_2$, it reacts with the photo-oxidant, in preference to the color-generator, to deactivate the photo-oxidant so that it will not react with the color-generator. The requirement for the selection of specific photo-oxidants and the redox couple reactants as well as the requirement for two separate irradiation steps for developing and fixing the color image renders this composition unsuitable for many applications.

Organic acid salts of triarylmethane dyes are used as sensitizers in electrophotographic elements described by Fox, et al. in U.S. Pat. No. 3,488,705. The triarylmethane salts are used in combination with photoconducting compounds to provide exposed and developed electrophotographic elements having colorless background areas. The thermal instability of the triarylmethane salt is taken advantage of after an image on the element is obtained by heating the element to decompose and bleach the dye compound to provide the colorless background area. The photoconductive materials used in the compositions are organic photoconductors. The utility of the sensitized photoconductive compositions are apparently limited to their application in electrophotography.

Brinckman, el al., U.S. Pat. No. 3,579,337 disclose a process of reproduction using a recording layer containing hexacyanoferrate (III) ions and a substrate providing metal ions of zinc, cadmium, mercury, copper, silver, gold and lead. This process requires the exposure of the hexacyanoferrate (III) ions to electromagnetic radiation to reduce it to hexacyanoferrate (II) ions which react with the metal ions to form a precipitate having a strong attraction for a cationic dye. The exposed layer is developed by uniform contact with a developing solution containing the cationic dye. Preferred cationic dyes are derived from a leuco base such as leuco bases described in British Patent Specification No. 1,032,264. The preferred cationic dyes are triarylmethane dyes and thiazine dyes. Brinckman, et al. disclose that the sensitivity of the recording element is improved by an n-type inorganic photoconductive substance in combination with the hexacyanoferrate (III) ions. Zinc oxide and titanium (IV) oxide are disclosed as photoconductive substances. It is further taught that when zinc oxide is the photoconductive substance it may also serve as the substance providing the zinc ions. The recording layer disclosed by Brinckman, et al. and the process utilizing the same also suffer from the drawback of requiring development with a separate developing solution.

SUMMARY OF THE INVENTION

It has now been found that highly stable color producing compositions which eliminate the risk of premature reaction and which do not require a separate chemical developing step are provided by compositions which contain triphenylmethane paraamino leuco salts which have been mixed thoroughly with certain metallic oxides or metallic sulfides. It has been found that the photochromic properties of the colorless leuco salts are completely inactivated or blocked when they are combined with the metallic oxides or metallic sulfides but that the chromogenic activity is restored by the application of energy in the form of heat or pressure. Very useful recording materials are prepared by depositing a layer of the triphenylmethane paraamino leuco salt which has been intimately mixed with the metallic oxide or metallic sulfide on a suitable substrate.

The recording material can be used for recording information in the form of colored marks by heating the surface of the sensitive material in an image-wise manner corresponding to the desired information to a temperature sufficient to reactivate the photochromic activity of the leuco salt. Alternatively the recording material can be developed by the application of a mechanical force according to a desired pattern which corresponds to the information to be recorded, followed by exposing the surface to ultraviolet radiation.

The leuco salt and metallic compound are advantageously dispersed in a suitable resinous binder which can also include a low melting point material which makes it possible to lower the temperature required to restore the chromogenic activity. The incorporation of acidic materials also improves the visual contrast of the recorded information.

DETAILED DESCRIPTION OF THE INVENTION AND PREFERRED EMBODIMENTS

The photosensitive chromogenic composition according to the present invention includes an intimate mixture of:

a. triphenylmethane paraamino leuco salt of the formula

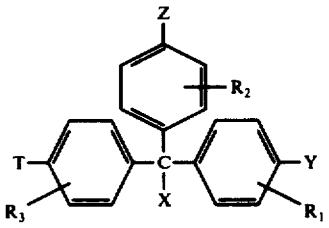

wherein X is halogen, CN or $HSO_3$; Y, Z and T which may be the same or different are hydrogen or a substituted or unsubstituted amino group, with the proviso that at least one of Y, Z and T is an amino group; and $R_1$, $R_2$ and $R_3$ which may be the same or different are hydrogen, halogen or alkyl of 1 to 3 carbon atoms; and b. a metallic oxide or metallic sulfide selected from the group consisting of zinc sulfide, zinc oxide, tin oxide, titanium oxide, alumina and silica.

These leuco salts are well known in the prior art, and their properties as well as methods of production are described in, for example, U.S. Pat. Nos. 2,366,179, 2,864,751 and 2,877,169 issued to Lyman Chalkley.

The preferred leuco salts for use in the compositions and recording materials of the present invention are those derived from pararosaniline, malachite green and crystal violet.

Although the precise mechanism by which the above specified metallic oxides and metallic sulfides block the photochromic activity of the leuco salts is not known, it has nevertheless been observed that when the two components are thoroughly mixed with each other the photochromic activity is not restored until sufficient energy has been applied to the mixture.

The metallic oxides and metallic sulfides which can be used in the compositions of the present invention need not be of any particular purity or particle size and can be utilized in their commercially available forms. However, these compounds should be utilized in sufficient purity so as not to provide any discoloration in the background of the recording material. In this regard, since the metallic compounds are white and since the leuco salts are colorless the compositions form recording materials which have a pleasing appearance and which accentuate the contrast of the colored marks resulting from the development of the corresponding leuco dyes.

Although the ratio of the leuco salt to metallic compound is not particularly critical, suitable results have been found when the ratio of leuco salt to metallic compound is from 0.001:1 to 0.05:1, on a weight basis.

The leuco salt and metallic compound which form the essential components of the sensitive composition of the present invention are generally dispersed in a suitable polymeric resin, as binder. Any of the conventionally used resinous binders for sensitive compositions can be used in the present invention. Preferred binders commonly used in graphic recording materials include polyvinyl alcohol, polyvinyl acetate, polyvinyl carbazole, polyester resins, hydroxyethylcellulose, etc.

The sensitive composition containing the leuco salt and metallic compound is deposited on a support (base layer) from a solvent solution or dispersion using a solvent for the resinous binder. The coated support is then dried to remove the solvent medium. Drying can be performed in any conventional manner, e.g. evaporation, heating oven, etc. The solvent solution or dispersion is applied to the support in amounts sufficient to provide a coating of at least 3 grams per square meter and preferably 4 $g/m^2$ to 15 $g/m^2$.

The selection of the solvent is not particularly critical and will depend on the nature of the resin. Suitable solvents can include water, alcohol, toluene, etc. Preferably, the solvent selected for the particular resin will not be a solvent for the leuco salt. In this manner it is possible to obtain a homogeneous distribution of the sensitive composition throughout the binder and thereby provide a more distinct colored mark and better stability of the background. It is, therefore, possible to provide recording materials having a perfectly white background which is stable against exposure to ordinary sunlight.

The ratio of the resinous binder to the sensitive composition is also not particularly critical but is preferably selected to provide a ratio of resin to metallic compound of from 0.1:1 to 1:1, on a weight basis.

Therefore, in accordance with one embodiment the present invention is directed to compositions for use in the production of colored images by the local application of an energy source, such as heat and/or pressure, which comprises an intimate mixture of: (a) a colorless, chromogenic triphenylmethane paraamino leuco salt and (b) a metallic oxide or metallic sulfide, i.e. zinc sulfide, zinc oxide, tin oxide, titanium oxide, alumina or silica; the weight ratio of (a) to (b) being from 0.001:1 to 0.05:1. The intimate mixture of (a) and (b) is uniformly dispersed in a resinous binder.

In accordance with a particular embodiment of the present invention it has been found advantageous to incorporate in the sensitive composition a normally solid material having a low melting point, i.e. in the range of about 60° C. to about 110° C. The role of this material is to melt, under the application of the heat energy, during the development process of the present invention and to thereby lower the temperature to which the sensitive composition must be brought to unblock the chromogenic activity of the leuco salt. Therefore, the melted, normally solid low melting point material will preferably act as a solvent for the leuco salt.

Any material which satisfies the above requirements (e.g. melting point range and solvent for the leuco salt) and which will not interfere with the chromogenic activity of the leuco salt can be used in this invention. Examples of normally solid, low melting temperature materials include: resins such as polyvinyl acetate, waxes such as paraffin wax, bees wax, Carauba wax, etc., spermaceti, fatty acids and inorganic and organic salts of fatty acids such as the calcium, barium, sodium, amine, etc., salts of stearic acid, palmitic acid, myristic acid, lauric acid, behenic acid, caproic acid, oleic acid, ricinoleic acid, naphthenic acid, etc.

The proportion of the normally solid, low melting point material which is incorporated in the resinous binder generally ranges from 0.1 to about 1 part by weight, by weight of the binder. Depending on the amount of the normally solid, low melting point material which is incorporated in the binder it is possible to lower the temperature at which the irreversible coloration of the chromogenic compound appears by as much as 30° C. to 40° C.

Therefore, in accordance with a preferred embodiment of the present invention the sensitive compositions further comprise (c) a normally solid, low melting point material as previously defined.

In accordance with a further embodiment of the present invention the photosensitive, chromogenic compositions further include an acid or salt having an acidic character. It has been found that the presence of such acidic material results in a significant improvement of the visual contrast of the recorded data in the form of colored marks. The acids or salts having an acid character which can be used in the present invention can be organic or inorganic and include those acidic substances defined in accordance with the Bronsted Theory (see, for example, "Les Methodes de la Chimie Analytique" by G. Charlot, page 4, Masson & Co. Editors, 1961).

As examples of the substances of the acidic character the following materials can be mentioned: stearic acid, orthophosphoric acid, phosphomolybdic acid, perchloric acid, trichloracetic acid, paratoluene sulfonic acid, phosphotungstic acid, sodium bisulfite, zinc chloride, ammonium chloride, etc. While any acidic substances will heighten the contrast of the colored marks in the developed recording material the acidic substance which is selected should be compatible with the other products in the sensitive compositions. The primary criteria for determining compatibility is simply the dispersibility of the acidic substance in the composition.

Generally, the acidic substance is present in the composition in an amount of from about 0.2 to about three times the weight of the leuco salt. If a lesser amount is used then the heightening of the contrast of the colored mark is not sufficiently improved. On the other hand, if the amount of the acidic substance is more than three times the amount of the leuco salt it has been observed that the blocking of the chromogenic activity of the leuco salt and the stability of the leuco salt in its colorless form is impaired.

It is apparent that when the normally solid, low melting point material is a fatty acid, such as stearic acid or behenic acid, it is not necessary to also include an additional acidic substance, although since stearic acid has been found to be less efficient in improving the color contrast, it may be preferable to include an additional acidic substance.

The sensitive compositions of the present invention can be prepared by any suitable means as long as the ingredients are intimately mixed. For example, solutions of each of the components in volatile solvents, such as water, methanol, ethanol, acetone, methylethylketone, ethyl acetate, ethylene glycol monomethylether and the like can be prepared and mixed with each other. It is also possible to mix each of the components in dry form, e.g. finely divided powder and then apply the composition in solution form or otherwise to any suitable base layer. Suitable base layers for the photosensitive, chromogenic compositions of the present invention include any of the conventionally used supports for recording materials such as paper, plastic film, metallic sheets, etc.

The compositions can be applied to the support by any standard means, such as, for example, spraying, rollers, scrapers, and the like. The photosensitive composition is applied as a thin layer to the support and allowed to dry. Preferably, the photosensitive layer, as a dispersion, is deposited on the support in an amount sufficient to present at least 3 $g/m^2$ and preferably about 4 $g/m^2$ to 15 $g/m^2$.

Although it is not required, the photosensitive compositions of the present invention may include, in addition to the chromogenic material, metallic compound, and binder or binders additional adjuvants such as surfactants to improve the adhesion of the composition on the support, wetting agents to facilitate application to the support, humectants and the like. The recording materials of the present invention which include the photosensitive, chromogenic compositions deposited on a support, can be used for recording information in the form of colored marks which may take the form of any intelligible symbol including, but not limited to, letters, numbers, dots, lines, geometric symbols, etc.

As previously indicated the recording material, prior to development, will generally have a white background since the leuco salt is stabilized in its colorless form and the metallic compound will also have a white color.

According to the process of the present invention information is recorded in the form of colored marks on the recording material by the application of energy, in the form of heat and/or pressure and electromagnetic radiation, the energy being applied according to a predetermined pattern corresponding to the information to be recorded. This procedure is well known in the art and is commonly employed in a wide variety of scientific recording apparatus, telecopying apparatus, electric printers at computer outputs and in similar applications.

The energy application can be in the form of heat, for example by means of a heating head or by infrared radiation. It has been found that the chromogenic activity of the leuco salt is restored when the temperature of the sensitive composition becomes at least 110° C. Accordingly, the surface of the recording material will be kept in contact with the heating head or the infrared radiation will be applied for a time sufficient to raise the temperature of the photosensitive composition to at least 110° C. The most suitable temperature for a particular leuco salt and metallic compound can be easily determined by routine experimentation.

The energy application can also be in the form of mechanical energy such as the application of a pressure to the recording material. It has been found that it is necessary to apply a pressure of at least about 100 g/mm² in order to unblock the chromogenic activity of the leuco salt. When the energy source is a mechanical energy, which can be applied, for instance, by the use of a stylet, it is also necessary to follow the mechanical energy application by application of additional electromagnetic energy, for example ultraviolet radiation having a wavelength in the range of from about 300 to about 400 millimicrons.

When the latter form of energy is utilized the mechanical energy application has the effect of unblocking or restoring the photochromic activity of the leuco salt by counteracting the effect of the metallic compound. The ultraviolet radiation is required to effect the photochemical reaction resulting in the transformation of the colorless leuco salt to the corresponding leuco dye. When a thermal energy source is utilized the unblocking of the photochromic activity and the coloration of the leuco salt occur substantially simultaneously.

Suitable apparatus which can be used to effect the process of the present invention are well known in the art and do not require any detailed discussion.

For the purpose of further illustrating and giving a better understanding of the invention, the following specific embodiments are set forth. However, these examples are not intended to be limiting in any sense.

EXAMPLE 1

The following ingredients are thoroughly mixed in a ball mill:

3.5 g of copolymer of a vinyl resin and butyl maleate (Coatrez 1464 of the Steinhall Company)
7.5 g of zinc oxide
10 g of toluene
2.5 g of ethanol
0.1 g of hexa-β-hydroxyethyl pararosaniline When this dispersion is homogeneous it is coated on a sheet of paper and dried for 2 minutes in an oven at 80° C.

A control specimen was made under the same conditions but with the zinc oxide eliminated.

The two sheets were treated by the local application of thermal energy, according to a pattern corresponding to the desired information, using the heating head of the apparatus sold under the registered trademark Simpliscriptor Ek.75 of Hellige-France Society (recording apparatus with heated stylus for medical applications). The heating head moves at a speed of 25 mm/sec. On the control specimen a bluish mark of slight coloration appeared but disappeared shortly thereafter by heightening of the background. On the recording material of the present invention wherein the sensitive layer containing both the photochrome and zinc oxide a permanent deep blue mark appeared while the whitish tint of the background remained perfectly stable.

The optical density of the mark obtained using a heating head of 1 square centimeter at a temperature of 180° C. applied to the recording sheet of the present invention for a period of one second, was measured by reflection using a standardized MacBeth RD 100 microdensitometer equipped with a yellow filter. An optical density of 0.41 was measured.

In order to demonstrate the strengthening of the optical density resulting from the incorporation of an acid or acid salt in the compositions of the present invention the composition of Example 1 was tested under the identical conditions described above after the incorporation of 0.1 gram of the following acid or acid salt:

| Acid or Acid Salt | Optical Density of the Colored Mark: D |
|---|---|
| stearic acid | 0.45 |
| orthophosphoric acid | 0.45 |
| phosphomolybdic acid | 0.59 |
| perchloric acid | 0.60 |
| trichloracetic acid | 0.60 |
| paratoluene sulfonic acid | 0.71 |
| phosphotungstic acid | 0.75 |
| sodium bisulfite | 0.61 |
| zinc chloride | 0.74 |
| ammonium chloride | 0.75 |

EXAMPLE 2

In the composition described in Example 1, the zinc oxide is replaced by the same amount of zinc sulfide, the treatment being identical otherwise. The mark left by the heating head also presents a blue tint, the background remaining stable.

EXAMPLE 3

A similar result is obtained by operating in the same manner as described in Example 1 using the following composition:

10 g of a 10% solution of Rhodoviol 4/125P (a resin with a polyvinyl alcohol base of the Rhone-Poulenc Company) in water
3 g of Aerosil 200 silica of the Degussa Company
0.05 g of hexa hydroxyethyl rosaniline
10 g of water A control paper was coated with an identical composition except the silica was omitted.

By operating in the same way as in the above examples, a blue mark on a stable background was obtained. However, a bluish background rapidly appears over the entire surface of the control sheet.

EXAMPLE 4

A similar result is obtained if silica is replaced by alumina in the composition described in Example 3.

EXAMPLE 5

In a ball mill with ultrafast alternating movement (Dangoumeau), a very homogeneous dispersion of the following composition was prepared 6 g of zinc oxide
0.04 g of tri(para dimethylamino, meta chloro phenyl) cyano methane (leuco crystal violet)
7 g of a 15% solution of hydroxy ethyl cellulose (Natrosol of the Hercules Powder Company) in water
10 g of water Operating as in the above examples, there was obtained, by means of a heating head brought to 170° C., a mark of blue tint on a white background whereas on a control specimen minus the zinc oxide, a mark of slight coloration was obtained but rapidly disappeared in a heightening of the background.

EXAMPLE 6

By incorporating 2 grams of Rhodopas BB3 (polyvinyl acetate with a softening point of 65° C., of the Rhone-Poulenc Company) and 0.15 grams of zinc chloride, a salt known for its acid character, to the composition of Example 5, a colored mark of increased contrast is obtained using a heating head brought to a temperature of only 110° C.

EXAMPLE 7

By adding 0.1 gram of stearic acid or behenic acid, normally solid compounds having a low melting point and exhibiting an acidic character, to the composition of Example 5, a colored mark having a contrast superior to that of the mark obtained in Example 5 but inferior to that obtained in Example 6 is obtained using a heating head brought to a temperature of 140° C.

However, it has been found that the exclusive use of the normally solid, low melting point materials as the binder provides recording materials whose sensitive layers have increased fragility and it is therefore recommended to use the low melting temperature materials with the more resistant binders such as polyvinyl alcohol, hydroxy ethylcellulose, etc.

EXAMPLE 8

When the crystal violet in the composition of Example 5 is replaced by bis(para dimethyl amino phenyl) phenyl chloro methane (malachite green) it is possible to obtain extremely clear green marks under the same conditions as used in the previous examples.

EXAMPLE 9

A photosensitive composition is obtained by thoroughly mixing in a ball mill the following ingredients:

6 g of zinc oxide 10 g of a 10% solution of Rhodoviol 4/20, (a resin of the Rhone-Poulenc Company, also with a polyvinyl alcohol base), in water 0.05 g of hexa hydroxy ethyl rosaniline 15 g of water By the application of pressure using a stylet followed by exposure for 5 seconds to radiation from a HPK 125 ultraviolet lamp of the Philips Company, placed 10 centimeters from the recording material, there is obtained a deep blue mark. The colored marks will not appear until they are exposed to the ultraviolet radiation.

EXAMPLE 10

Colored marks of a purplish blue tint can be obtained under the same conditions as used in Example 9 from a photosensitive composition prepared from the following ingredients:

6 g of titanium oxide AT1 of the Societe Tita France 0.03 g of tri(para dimethyl amino phenyl) cyano methane, (hexamethyl leuco violet)

7.5 g of a 10% solution of Rhodoviol 5/270 P, (resin with a polyvinyl alcohol base of the Rhone-Poulenc Company) in water 6 g of water The present invention therefore provides photosensitive compositions and recording materials which can be used to produce information, in the form of colored marks, which have proven durable and irreversible.

Many modifications and variations of this invention will be obvious to persons skilled in the art and it is to be understood that such modifications and variations are to be included within the purview of this application and the spirit and scope of the appended claims.

What is claimed is:

1. A composition for use in the production of colored images by the application of heat or pressure comprising an intimate mixture of:

a. triphenylmethane paraamino leuco salt of the formula:

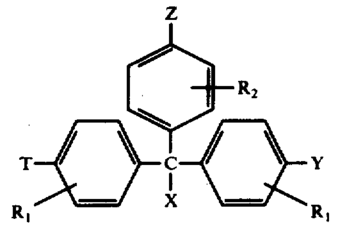

wherein X is halogen, CN or $HSO_3$; Y, Z and T which may be the same or different are hydrogen or a substituted or unsubstituted amino group, with the proviso that at least one of Y, Z and T is an amino group: and $R_1$, $R_2$ and $R_3$ which may be the same or different are hydrogen, halogen or alkyl of 1 to 3 carbon atoms; and b. a metallic oxide or metallic sulfide selected from the group consisting of zinc sulfide, zinc oxide, tin oxide, titanium oxide, alumina and silica wherein the ratio of (a) to (b) is from 0.001:1 to 0.005:1 by weight.

2. The composition of claim 1 wherein the intimate mixture of (a) and (b) is uniformly dispersed in a resinous binder.

3. The composition of claim 2 wherein the ratio of said resinous binder to (b) is from 0.1:1 to 1:1 by weight.

4. The composition of claim 3 which further comprises (c) a normally solid low melting point material.

5. The composition of claim 4 wherein said low melting point material (c) has a melting point of from 60° C. to 110° C.

6. The composition of claim 5 wherein the low melting point material (c) is present in an amount of from 0.1 to 1 part by weight of the resinous binder.

7. A recording material comprising a support and a layer of the composition of claim 6 deposited on said support in an amount of at least 3 $g/m^2$.

8. The recording material of claim 7 wherein the amount of said composition is from about 4 $g/m^2$ to about 15 $g/m^2$.

9. The composition of claim 6 wherein said low melting point material (c) is a member selected from the group consisting of polyvinyl acetate, paraffin wax, beeswax, Carnauba wax, spermaceti, stearic acid, palmitic acid, myristic acid, lauric acid, behenic acid, caproic acid, oleic acid, ricinoleic acid and naphthenic acid or calcium, barium, sodium or amine salt of said acids.

10. The composition of claim 3 wherein said resinous binder is a member selected from the group consisting of polyvinyl alcohol, polyvinyl acetate, polyvinyl carbazole, polyester resin and hydroxyethylcellulose.

11. A recording material comprising a support and a layer of the composition of claim 2 deposited on said support.

12. The recording material of claim 11 wherein the amount of said composition is at least 3 $g/m^2$.

13. The recording material of claim 11 wherein the amount of said composition is from about 4 $g/m^2$ to about 15 $g/m^2$.

14. A process for recording information in the form of colored marks produced by a leuco dye, said process comprising applying thermal energy or mechanical pressure, according to a predetermined pattern corresponding to the information to be recorded, to the surface of the recording material of claim 11 for a time sufficient to unblock the chromogenic activity of the leuco salt present on said surface in only those areas where said energy has been applied and transforming the unblocked colorless leuco salt to the colored leuco dye.

15. The process of claim 14 which comprises applying thermal energy in said predetermined pattern to the surface of said recording material for a time sufficient to raise the temperature of said surface to at least 110° C. whereby the chromogenic activity of said leuco salt is unblocked and said leuco salt is transformed to said leuco dye substantially simultaneously.

16. The process of claim 15 wherein said thermal energy application is performed by contacting said surface of the recording material with a heated body for a time sufficient to raise the temperature of said surface to at least 110° C.

17. The process of claim 15 wherein said thermal energy is in the form of infrared radiation.

18. The process of claim 14 which comprises applying a pressure of at least 100 $g/mm^2$ in said predetermined pattern to the surface of said recording material and thereafter exposing said surface to ultraviolet radiation having a wavelength in the range of from about 300 to about 400 millimicrons.

19. The composition of claim 1 wherein said leuco salt is selected from the group consisting of pararosaniline, malachite green and crystal violet and derivatives thereof.

20. The composition of claim 1 which further comprises (d) from 0.2 to 3 times by weight of the leuco salt (a) of an acid or acid salt.

21. The composition of claim 20 wherein said acid or acid salt is selected from the group consisting of stearic acid, orthophosphoric acid, phosphomolybdic acid, perchloric acid, trichloracetic acid, paratoluene sulfonic acid, phosphotungstic acid, sodium bisulfite, zinc chloride and ammonium chloride.

22. A recording material comprising a support and a layer of the composition of claim 21 deposited on said support in an amount of at least 3 $g/m^2$.

23. The recording material of claim 22 wherein the amount of said composition is from about 4 $g/m^2$ to about 15 $g/m^2$.

* * * * *